US012621150B2

(12) United States Patent
Schoenauer et al.

(10) Patent No.: US 12,621,150 B2
(45) Date of Patent: May 5, 2026

(54) BIT-ROTATION TO PREVENT SINGLE-BIT LEAKAGE IN LATTICE BASED CRYPTOGRAPHY

(71) Applicant: NXP B.V., Eindhoven (NL)

(72) Inventors: Markus Schoenauer, Vienna (AT);
Melissa Azouaoui, Norderstedt (DE);
Olivier Bronchain, Auderghem (BE);
Tobias Schneider, Graz (AT)

(73) Assignee: NXP B.V., Eindhoven (NL)

( * ) Notice: Subject to any disclaimer, the term of this patent is extended or adjusted under 35 U.S.C. 154(b) by 240 days.

(21) Appl. No.: 18/326,635

(22) Filed: May 31, 2023

(65) Prior Publication Data

US 2024/0405986 A1    Dec. 5, 2024

(51) Int. Cl.
H04L 9/30 (2006.01)

(52) U.S. Cl.
CPC .................................. H04L 9/3093 (2013.01)

(58) Field of Classification Search
CPC .................................................... H04L 9/3093
See application file for complete search history.

(56) References Cited

U.S. PATENT DOCUMENTS 6,182,216 B1 * 1/2001 Luyster ................. H04L 9/0625
713/168
8,296,577 B2 * 10/2012 Shu ..................... G06F 9/30181
380/46

11,416,638 B2    8/2022 Banerjee
12,425,189 B1 * 9/2025 Lablans ................ H04L 9/0643
2008/0019509 A1    1/2008 Al-Gahtani
2022/0012334 A1    1/2022 Ghosh

FOREIGN PATENT DOCUMENTS

WO    WO-2014093708 A1 * 6/2014 ............. G06F 7/724
WO    WO-2018118569 A1 * 6/2018 ............. G06F 11/30

OTHER PUBLICATIONS

Melissa Azouaoui, Olivier Bronchain, Gaetan Cassiers, Clement, Hoffmann, Yulia Kuzovkova, Joost Renes, Tobias Schneider, Markus, Sch6nauer, Francois-Xavier Standaert, and Christine van Vredendaal, Leveling dilithium against leakage: Revisited sensitivity analysis and improved implementations, IACR Cryptol. ePrint Arch. 2022 (2022), 1406.
L. Ducas, Eike Kiltz, Tancrede Lepoint, Vadim Lyubashevsky, P. Schwabe, Gregor Seiler, and D. Stehle, Crystals—algorithm specifications and supporting documentation (version 3.1), 2021.
Yuejun Liu, Yongbin Zhou, Shuo Sun, Tianyu Wang, Rui Zhang, and Jingdian Ming, On the security of lattice-based fiat-shamir signatures in the presence of randomness leakage, IEEE Transactions on Information Forensics and Security 16 (2021), 1868-1879.

(Continued)

*Primary Examiner* — Lynn D Feild
*Assistant Examiner* — Abdullah Almamun

(57) ABSTRACT

A system and method of carrying out a binary arithmetic operation in a cryptographic operation for lattice-based cryptography. The variables used in the binary arithmetic operation may have their bits randomly rotated to counter side channel attacks. An addition and multiplication operation on variables with rotated bits are disclosed.

19 Claims, 3 Drawing Sheets

(56)                  References Cited

OTHER PUBLICATIONS

Soundes Marzougui, Vincent Ulitzsch, Mehdi Tibouchi, and Jean-Pierre Seifert, Profiling side-channel attacks on dilithium: A small bit-fiddling leak breaks it all, Cryptology ePrint Archive, Paper 2022/106, 2022, https: //eprint. iacr.org/2022/106.

Vincent Migliore, Benoit Gerard, Mehdi Tibouchi, and Pierre-Alain Fouque, Masking dilithium-efficient implementation and side-channel evaluation, ACNS, Lecture Notes in Computer Science, vol. 11464, Springer, 2019, pp. 344-362.

National Institute of Standards and Technology, Post-quantum cryptography standardization, https: / / csrc. nist . gov /Pro j acts/Post-Quantum-Cryptography/Post-Quantum-Cryptography-Standardization.

Robert Primas, Peter Pessl, and Stefan Mangard, Single-trace side-channel attacks on masked lattice-based encryption, CHES, Lecture Notes in Computer Science, vol. 10529, Springer, 2017, pp. 513-533.

An Wang, Ce Wang, Xuexin Zheng, Weina Tian, Rixin Xu, and Guoshuang Zhang, Random key rotation: Side-channel countermeasure of NTRU cryptosystem for resource-limited devices, Comput. Electr. Eng. 63 (2017), 220-231.

* cited by examiner

MI FOR SAME REGISTER,
OMEGA = 4, q = 7, HW LEAKAGE MODEL

MI FOR SAME REGISTER,
OMEGA = 4, NBITS = 3, HW LEAKAGE MODEL

MI FOR DIFFERENT REGISTERS,
OMEGA = 4, q = 7, WEIGHTED HW LEAKAGE MODEL

MI FOR DIFFERENT REGISTERS,
OMEGA = 4, NBITS = 3, WEIGHTED HW LEAKAGE MODEL

MI FOR UNPROTECTED, ROTATED, AND MASKED MODEL
OMEGA = 4, NBITS = 3, k = 1, HW LEAKAGE MODEL

BIT-ROTATION TO PREVENT SINGLE-BIT LEAKAGE IN LATTICE BASED CRYPTOGRAPHY

FIELD OF THE DISCLOSURE

Various exemplary embodiments disclosed herein relate to bit-rotation to prevent single-bit leakage in lattice based cryptography.

BACKGROUND

Recent significant advances in quantum computing have accelerated the research into post-quantum cryptography schemes: cryptographic algorithms which run on classical computers but are still secure even when faced with an adversary with access to a quantum computer. This demand is driven by interest from standardization bodies, such as the call for proposals for new public-key cryptography standards by the National Institute of Standards and Technology (NIST). On Jul. 5, 2022, NIST selected two primary algorithms to standardize: CRYSTALS-Kyber for key establishment and CRYSTALS-Dilithium for digital signatures. In addition, NIST also chose two further signature schemes (FALCON and SPHINCS+) for standardization. While the latter are expected to have specialized applications (e.g., FALCON for servers with floating point support), CRYSTALS-Dilithium (which is referred to as Dilithium in the rest of this disclosure) is expected to be the general replacement for elliptic curve cryptography digital signatures (e.g., Elliptic Curve Digital Signature Algorithm (ECDSA)), in particular for embedded use cases.

SUMMARY

A summary of various exemplary embodiments is presented below.

Further various embodiments relate to a data processing system including instructions embodied in a non-transitory computer readable medium, the instructions for carrying out a binary arithmetic operation in a cryptographic operation for lattice-based cryptography in a processor, the instructions, including: performing a binary addition of a first binary value $x_1$ and a second binary value $y_1$ with $\omega$ bits, wherein bits of the first binary value $x_1$ are rotated by a first rotation value $s_1$ and bits of the second binary value $y_1$ are rotated by a second rotation value $t_1$, including: rotating the bits of the first binary value $x_1$ by the second rotation value $t_1$ to produce a first rotated binary value $x_{1,rot}$; rotating the bits of the second binary value $y_1$ by the first rotation value $s_1$ to produce a second rotated binary value $y_{1,rot}$; calculating a third rotation value $r_1$ by adding the first rotation value $s_1$ and the second rotation value $t_1$ modulo $\omega$; and performing a binary addition of the first rotated binary value $x_{1,rot}$ and the second rotated binary value $y_{1,rot}$ to produce a third rotated binary value $z_1$, wherein the bits of the third rotated binary value $z_1$ are rotated by the third rotation value $r_1$; and performing a binary multiplication of a fourth binary value $x_2$ and a fifth binary value $y_2$ with $\omega$ bits, wherein the bits of the fourth binary value $x_2$ are rotated by a fourth rotation value $s_2$ and the bits of the fifth binary value $y_2$ are rotated by a fifth rotation value $t_2$, including: initializing a sixth rotated value $z_2$ to zero; for each bit i of the fifth binary value $y_2$ that is equal to 1; calculating a sixth rotation value $r_2$ by subtracting the fifth rotation value $t_2$ from i where i is an index; rotating the bits of the fourth binary value $x_2$ by the sixth rotation value $r_2$ to produce a fourth rotated binary value $x_{2,rot}$; and performing a binary addition of the fourth rotated binary value $x_{2,rot}$ and the sixth rotated value $z_2$ to update the sixth rotated value $z_2$, wherein the bits of the sixth rotated value $z_2$ are rotated by the fourth rotation value $s_2$.

Various embodiments are described, wherein $\omega$ is a power of two and wherein adding the first rotation value $s_1$ and the second rotation value $t_1$ modulo $\omega$ includes calculating $(s_1+t_1)/\backslash(\omega-1)$.

Various embodiments are described, wherein a has a value greater than k where k is a number of bits in $x_1$ and $y_1$ and wherein a zero is adjacent the most significant bits of $x_1$ and $y_1$.

Various embodiments are described, wherein a portion of the bits between the zero adjacent the most significant bits of $x_1$ and $y_1$ and a least significant bits of $x_1$ and $y_1$ are set to random values.

Various embodiments are described, wherein a has a value greater than 2k where k is a number of bits in $x_2$ and $y_2$ and wherein k zeros are adjacent the most significant bits of $x_2$ and $y_2$.

Various embodiments are described, wherein a portion of the bits between the k zeros adjacent the most significant bits of $x_2$ and $y_2$ and a least significant bits of $x_2$ and $y_2$ are set to random values.

Various embodiments are described, further including randomly generating $s_1$, $t_1$, $s_2$, and $t_2$.

Further various embodiments relate to a data processing system including instructions embodied in a non-transitory computer readable medium, the instructions for carrying out a binary arithmetic operation in a cryptographic operation for lattice-based cryptography in a processor, the instructions, including: performing a binary addition of a first binary value $x_1$ and a second binary value $y_1$ with $\omega$ bits, wherein bits of the first binary value $x_1$ are rotated by a first rotation value $s_1$ and bits of the second binary value $y_1$ are rotated by a second rotation value $t_1$, including: calculating a third rotation value $r_1$ by subtracting the second rotation value $t_1$ from the first rotation value $s_1$ modulo $\omega$; rotating the bits of the second binary value $y_1$ by the third rotation value $r_1$ to produce a second rotated binary value $y_{1,rot}$; and performing a binary addition of the first binary value $x_1$ and the second rotated binary value $y_{1,rot}$ to produce a third rotated binary value $z_1$, wherein the bits of the third rotated binary value $z_1$ are rotated by the first rotation value $s_1$; and performing a binary multiplication of a fourth binary value $x_2$ and a fifth binary value $y_2$ with $\omega$ bits, wherein the bits of the fourth binary value $x_2$ are rotated by a fourth rotation value $s_2$, including: initializing a sixth rotated value $z_2$ to zero; for each bit i of the fifth binary value $y_2$ that is equal to 1: rotating the bits of the fourth binary value $x_2$ by i to produce a fourth rotated binary value $x_{2,rot}$, where i is an index; and performing a binary addition of the fourth rotated binary value $x_{2,rot}$ and the sixth rotated value $z_2$ to update the sixth rotated value $z_2$, wherein the bits of the sixth rotated value $z_2$ are rotated by the fourth rotation value $s_2$.

Various embodiments are described, wherein $\omega$ is a power of two and wherein adding the first rotation value $s_1$ and the second rotation value $t_1$ modulo $\omega$ includes calculating $(s_1+t_1)/\backslash(\omega-1)$.

Various embodiments are described, wherein $\omega$ has a value greater than k where k is a number of bits in $x_1$ and $y_1$ and wherein a zero is adjacent the most significant bit of $x_1$.

Various embodiments are described, wherein a portion of the bits between the k zeros adjacent the most significant bits of $x_1$ and $y_1$ and a least significant bits of $x_1$ and $y_1$ are set to random values.

Various embodiments are described, further including randomly generating $s_1$, and $s_2$.

Further various embodiments relate to a method of carrying out a binary arithmetic operation in a cryptographic operation for lattice-based cryptography in a processor, including: performing a binary addition of a first binary value $x_1$ and a second binary value $y_1$ with $\omega$ bits, wherein bits of the first binary value $x_1$ are rotated by a first rotation value $s_1$ and bits of the second binary value $y_1$ are rotated by a second rotation value $t_1$, including: rotating the bits of the first binary value $x_1$ by the second rotation value $t_1$ to produce a first rotated binary value $x_{1,rot}$; rotating the bits of the second binary value $y_1$ by the first rotation value $s_1$ to produce a second rotated binary value $y_{1,rot}$; calculating a third rotation value $r_1$ by adding the first rotation value $s_1$ and the second rotation value $t_1$ modulo $\omega$; and performing a binary addition of the first rotated binary value $x_{1,rot}$ and the second rotated binary value $y_{1,rot}$ to produce a third rotated binary value $z_1$, wherein the bits of the third rotated binary value $z_1$ are rotated by the third rotation value $r_1$; and performing a binary multiplication of a fourth binary value $x_2$ and a fifth binary value $y_2$ with $\omega$ bits, wherein the bits of the fourth binary value $x_2$ are rotated by a fourth rotation value $s_2$ and the bits of the fifth binary value $y_2$ are rotated by a fifth rotation value $t_2$, including: initializing a sixth rotated value $z_2$ to zero that is equal to 1; for each bit i of the fifth binary value $y_2$: calculating a sixth rotation value $r_2$ by subtracting the fifth rotation value $t_2$ from i where i is an index; rotating the bits of the fourth binary value $x_2$ by the sixth rotation value $r_2$ to produce a fourth rotated binary value $x_{2,rot}$; and performing a binary addition of the fourth rotated binary value $x_{2,rot}$ and the sixth rotated value $z_2$ to update the sixth rotated value $z_2$, wherein the bits of the sixth rotated value $z_2$ are rotated by the fourth rotation value $s_2$.

Various embodiments are described, wherein a is a power of two and wherein adding the first rotation value $s_1$ and the second rotation value $t_1$ modulo $\omega$ includes calculating $(s_1+t_1)\wedge(\omega-1)$.

Various embodiments are described, wherein $\omega$ has a value greater than k where k is a number of bits in $x_1$ and $y_1$ and wherein a zero is adjacent the most significant bits of $x_1$ and $y_1$.

Various embodiments are described, wherein a portion of the bits between the zero adjacent the most significant bits of $x_1$ and $y_1$ and a least significant bits of $x_1$ and $y_1$ are set to random values.

Various embodiments are described, wherein a has a value greater than 2k where k is a number of bits in $x_2$ and $y_2$ and wherein k zeros are adjacent the most significant bits of $x_2$ and $y_2$.

Various embodiments are described, wherein a portion of the bits between the k zeros adjacent the most significant bits of $x_2$ and $y_2$ and a least significant bits of $x_2$ and $y_2$ are set to random values.

Various embodiments are described, further including randomly generating $s_1$, $t_1$, $s_2$, and $t_2$.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

The same reference numbers in different drawings may identify the same or similar elements.

DETAILED DESCRIPTION

Figure 1A:
FIGS. 1A-D illustrate the results of the simulations.
Figure 1A:
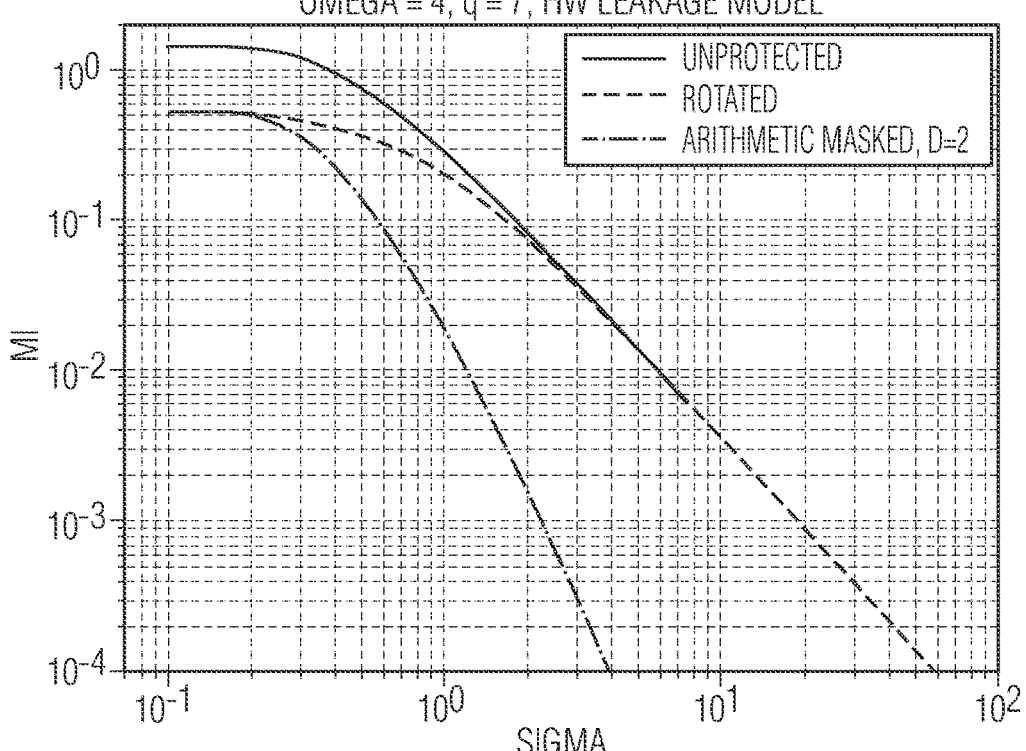

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of cryptographic systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Post-quantum lattice-based cryptography schemes can be targeted by side-channel analysis (SCA) that exploits data dependencies in physical measurements of the target device (e.g., power consumption). The state-of-the-art countermeasure against these attacks is to mask sensitive values. However, this introduces a significant performance overhead, especially for increasing security orders. In this disclosure, embodiments of a new and efficient approach to protect against a certain subset of SCA attacks are described. These embodiments are based on cyclic bit shift operations that hide the true position of the bits of sensitive values. Methods for addition and multiplication that are compatible with this new countermeasure are introduced.

It has been shown that unprotected implementations of post-quantum signature schemes (Dilithium among others) are vulnerable to implementation attacks, e.g., SCA. In particular, it has been demonstrated that the secret key can be extracted from physical measurements of key-dependent parts in the signing operation, even in situations where only one specific bit was leaked.

Masking is a common countermeasure to thwart side-channel analysis and has been utilized for various applications, including Dilithium. The downside, however, is the increased number of operations when dealing with masked values, and also the number of fresh random elements required to mask and refresh sensitive values. Both the computational and randomness complexity grow quadratically in the security order (for non-linear operations), which might be inhibiting on very resource constrained devices. In this disclosure, a protection method is described that is specifically designed to thwart one type of side-channel attacks on Dilithium (i.e., Yuejun Liu, Yongbin Zhou, Shuo Sun, Tianyu Wang, Rui Zhang, and Jingdian Ming, *On the security of lattice-based fiat-shamir signatures in the presence of randomness leakage*, IEEE Transactions on Information Forensics and Security 16 (2021), 1868-1879 and Soundes Marzougui, Vincent Ulitzsch, Mehdi Tibouchi, and Jean-Pierre Seifert, *Profiling side-channel attacks on dilithium: A small bit-fiddling leak breaks it all*, Cryptology ePrint Archive, Paper 2022/106, 2022, https://eprint.iacr.org/2022/106). For the affected operations, it provides a lightweight alternative to pure masking because it requires less random elements and fewer additional operations. Depending on the use case, it can either be deployed as a replacement for or in combination with masking, potentially helping to reduce the required security order (i.e., the number of shares) and with that improving the overall performance.

The side-channel attacks mentioned above will now be described in a bit more detail. In Dilithium, the signing procedure contains a computation step, where a vector z is calculated according to $$z = y + cs_1, \quad (1)$$

with the secret key $s_1$, a public polynomial c, and a secret nonce y. The parameters of Dilithium are chosen such that the value space of y is larger than that of $cs_1$ by several orders of magnitude, therefore hiding the value of $s_1$. However, if a specific bit of y (the exact index depends on the security level of Dilithium) were to be leaked, an adversary could potentially retrieve the secret $s_1$ using the knowledge of the sensitive bit of y and additional information, like z and c.

To protect y masking is currently used, and most commonly arithmetic masking. While this results in a linear overhead for the computation of z, it requires masking conversions before and after the computation which may be a bottleneck for higher security orders. In this disclosure, a lightweight countermeasure alternative to masking for the specific computation of z is proposed that protects against the aforementioned bit leakage attacks on y and can result in more efficient hardened implementations of Dilithium for certain use cases.

The embodiments disclosed herein build on the observation that the bit leakage attacks may be prevented in two ways. First, by hiding the value of the targeted bit completely as achieved by masking. Second, the attacks are also effectively prevented if the attacker cannot correctly assign the index of recovered bits. The post-processing step of the attacks requires reliable knowledge on the position of the targeted bit, so if this position is faulty the success rate drops significantly. On a polynomial-level this may be achieved via shuffling the coefficients, and embodiments described herein that use a new approach that works on a coefficient-level. A key feature is that it may be easily combined with polynomial-level shuffling and arithmetic masking.

Another key idea of embodiments described herein is the observation that the computation of z does not include a modular reduction due to the sizes of the involved variables. Therefore, it only requires basic arithmetic addition and multiplication, which are the target operations of the described countermeasure. In contrast to masking, where a sensitive value is split up into several shares, the embodiments described herein permute the bits of a sensitive value by applying a circular bit shift to hide the position of certain bits. This operation is similar to a regular bit shift; the difference is that any high bits that would get dropped on one side of the register are rotated to the other side. Note that for the algorithms presented it is assumed that left is the default shift direction, without loss of generality. A similar set of algorithms could work with right as the shift direction. In addition to the rotation of sensitive values, specialized algorithms are described that may add and multiply values that have been rotated. This enables implementing the computation of z hardened against bit leakage attacks. In general, the embodiments disclosed herein apply to other applications, in which only arithmetic addition and multiplication without modular reduction are performed, and the involved values may be targeted by bit leakage attacks.

As a first step, what is denoted as rotation is defined, and how rotation may be applied to a given value x. Let $\omega$ be the word length of the processor (usually 32 or 64 bits) and let $x \in [0, 2^\omega)$ and $s \in [0,\omega)$ be integers. Then the rotation $\rho_s(x)$ is defined as $$\rho_s(x) = (x \ll s) | (x \gg (\omega - s)), \quad (2)$$

with $\ll$, $\gg$ denoting the regular left and right shift respectively, and | the bitwise OR. To be able to recover the original value of x, s is combined with $\rho_s(x)$ into the tuple $\tilde{x} = (s, \rho_s(x))$. This is summarized in Algorithm 1.

| Algorithm 1 - Introduce Rotation (s, x) |
| --- |
| 1: $x_{rot} = (x \ll s) | (x \gg (\omega - s))$<br>2: return $\tilde{x} = (s, x_{rot})$ |

Later, it may be required to further rotate an already rotated value, say by t steps, with $t \in [0,\omega)$. This may easily be realized by adding s+t and applying $\rho_t$ to $x_{rot}$. If a value x is rotated by $\omega$ bits, it results in the original bit string, i.e., $\rho_\omega(x) = x$. This allows the range of rotation steps to be limited to $[0,\omega)$, and instead of s+t, s+t mod $\omega$ may be used to denote the resulting rotation of s and t. See Algorithm 2. Another useful definition is to set $\omega$ to a power of 2 (which is fulfilled for the cases of 32 and 64). This way the modular reduction may be performed as $(s+t)^\wedge(\omega-1)$.

---

Algorithm 2 - Rotate($\tilde{x} = (s, x_{rot})$, t)

1: $x_{rot}' = (x_{rot} << t)|(x_{rot} >> (\omega - t))$
2: $r = s + t \bmod \omega$
3: $\tilde{x}' = (r, x_{rot}')$

---

Next, a procedure to add two rotated values is presented in Algorithm 3. Let $\tilde{x}=(s,x_{rot})$ and $\tilde{y}=(t,y_{rot})$ be two rotated values. As a first step, it needs to be made sure that the bits of $x_{rot}$ and $y_{rot}$ are aligned, in the sense that the i-th bit of $x_{rot}$ is in the same position as the i-th bit of $y_{rot}$, for all $i \in [0,\omega-1]$. This may be done, for example, by applying $\rho_t$ to $x_{rot}$ and vice versa $\rho_s$ to $y_{rot}$ (see lines 1 and 2). This results in the combined rotation $r=s+t \bmod \omega$ (see line 3). Now $\rho_t(x_{rot})$ and $\rho_s(y_{rot})$ can be added like any regular binary numbers (see line 4). However, there are two details that need to be considered.

First, if the bits in the most significant position (that are not necessarily the most significant bits of the original bitstring) produce a carry, it will have to be carried to the cyclically next bits in the least significant position. This may be accomplished by performing a second round of addition where this carry c is added to the intermediate result of the first round of addition (see line 5).

Second, due to the rotation, the least significant bit (LSB) of a value will almost always be in a more significant position than the most significant bit (MSB). This creates a situation where a carry of the MSB can flow over to the LSB. To prevent this, it will be made sure that there is always at least one 0-bit between the LSB and the MSB, i.e., $x_{rot}=(\ldots, LSB, 0, MSB, \ldots)_2$, by choosing a suitable w. This requires a knowledge of the range of values that will be used. In Dilithium all integer arithmetic is performed mod q, with $q=2^{23}-2^{13}+1$, so the largest sum of two numbers is $(q-1)+(q-1)=2^{24}-2^{14}$. A processor word length of $\omega=32$ therefore provides sufficient spacing between least and most significant bit. So no unwanted carry can overflow from MSB to LSB in line 5.

---

Algorithm 3 - Addition($\tilde{x} = (s, x_{rot})$, $\tilde{y} = (t, y_{rot})$)

1: $x_{rot}' = (x_{rot} << t)|(x_{rot} >> (\omega - t))$
2: $y_{rot}' = (y_{rot} << s)|(y_{rot} >> (\omega - s))$
3: $r = s + t \bmod \omega$
4: $(z, c) = x_{rot}' + y_{rot}'$          ▷ Regular binary addition, with sum z and last carry c.
5: $z' = z + c$                                    ▷ Regular binary addition.
6: return $(r, z')$

---

A variation of this algorithm (which will be called lazy addition) fixes the rotation of the first input and only shifts the second input to align it. The rotation of the output sum is then simply the rotation of the first input. This could potentially lead to a decrease in security, because the rotation value of one of the inputs is reused. However, it leads to a slightly faster algorithm because of the reduced number of operations. See Algorithm 4.

---

Algorithm 4 - Lazy Addition ($\tilde{x} = (s, x_{rot})$, $\tilde{y} = (t, y_{rot})$)

1: $r = s - t \bmod \omega$
2: $y_{rot}' = (y_{rot} << r)|(y_{rot} >> (\omega - r))$
3: $(z, c) = x_{rot} + y_{rot}'$          ▷ Regular binary addition, with sum z and last carry c.
4: $z' = z + c$                                    ▷ Regular binary addition.
5: $(s, z')$

---

Before a procedure to multiply two rotated values is introduced, the case of a product between a rotated value $x_{rot}$ and a regular binary value y (which will be called mixed multiplication) will first be presented. It is similar to long integer multiplication but takes into account the rotation of the first input. First consider two regular integers x, y. Denote the i-th bit of y by $y_i$, then the product $x \cdot y$ may be written as follows:

$$x \cdot y = x \cdot \sum_{i=0}^{\omega-1} 2^i y_i = \sum_{i=0}^{\omega-1} 2^i x y_i = \sum_{i'} 2^{i'} x$$

The index i' in the last sum only ranges over those values in $[0,\omega-1]$ where $y_i=1$. Usually a multiplication by $2^i$ is equivalent to a left shift by i bits. But when it is applied to a rotated value $\tilde{x}=(s,x_{rot})$, a circular shift on $x_{rot}$ is instead performed while keeping the rotation s the same. This leads to Algorithm 5.

The value $z_{rot}$ of the product is initiated with zero (line 1), and then the algorithm iterates over those indices that have $y_1=1$ (lines 2 and 3). Next, a circular shift of i steps is applied to $x_{rot}$ (line 4), and this shifted value is added to $z_{rot}$ (line 5 and 6). This is done in a similar way to lines 4 and 5 in Algorithm 3. Lastly, $z_{rot}$ is output together with the rotation s from the input $\tilde{x}=(s, x_{rot})$ in line 7.

---

Algorithm 5 - Mixed Multiplication ($\tilde{x} = (s, x_{rot})$, y)

1: $z_{rot} = 0$
2: for $i \in [0, \omega - 1]$ do
3:    if $y_i = 1$ then
4:        $x_{rot}' = (x_{rot} << i)|(x_{rot} >> (\omega - i))$
5:        $(w, c) = z_{rot} + x_{rot}'$          ▷ Regular binary addition, with sum w and last carry c.
6:        $z_{rot} = w + c$                                    ▷ Regular binary addition.
7: return $(s, z_{rot})$

---

Next, this procedure is generalized to be able to process two rotated inputs $\tilde{x}$ and $\tilde{y}$. The only thing that has to be adapted is the offset i in line 4. Because $y_{rot,i}$ does not correspond to the i-th bit of the unrotated y anymore, but rather it is the (i+t)-th bit. All other steps remain unchanged, which leads to Algorithm 6.

---

Algorithm 6 - General Multiplication ($\tilde{x} = (s, x_{rot})$, $\tilde{y} = (t, y_{rot})$)

1: $z_{rot} = 0$
2: for $i \in [0, \omega - 1]$ do
3:    if $y_{rot,i} = 1$ then
4:        $r = i - t \bmod \omega$
5:        $x_{rot}' = (x_{rot} << r)|(X_{rot} >> (\omega - r))$
6:        $(w, c) = z_{rot} + x_{rot}'$          ▷ Regular binary addition, with sum w and last carry c.
7:        $z_{rot} = w + c$                                    ▷ Regular binary addition.
8: return $(s, z_{rot})$ As for the addition, it must be ensured that the word length a is sufficiently large to hold the resulting product and to guarantee that no overflow from the MSB to the LSB occurs. Therefore, $\omega$ has a value greater than 2k where k is a number of bits in $x_1$ and $y_1$ and wherein k zeros are adjacent the most significant bits of $x_1$ and $y_1$. In other words, each value needs to have zeros between the most significant bit and the $(2k+1)^{th}$ bit. For the specific use case in Dilithium, the highest possible product of two numbers is $(q-1)\cdot(q-1)=2^{46}-2^{37}+2^{26}$, so in general a processor word length of $\omega=64$ must be chosen. If the computation $z=y+cs_1$ is only considered, then the maximum values that occur are in the range $[-2^{19}-135, 2^{19+136}]$. In that case $\omega=32$ would suffice.

After describing the general layout of rotation and the arithmetic of rotated values, a few different options were considered for the implementation of this countermeasure. As mentioned before, the rotations are sampled from the range $[0,\omega)$. The most secure option is to use a fresh random rotation for each sensitive value. All the previous algorithms are designed with this assumption in mind.

A simpler option would be to sample $s\in[0,\omega)$ once and use it for all sensitive values. This would simplify the addition of rotated values, because the inputs would already be aligned. See Algorithm 7. Both the mixed and general multiplication would not be affected by the assumption of constant rotations, because the rotation of the output is always equal to the rotation of the first input.

A trade-off between the two variants may be achieved by grouping all sensitive values in such a way that only those values that get added to each other use the same rotation, while values from different groups (that are not added) use a different rotation value.

---

Algorithm 7 - Addition for Constant Rotation ($\tilde{x} = (s, x_{rot})$, $\tilde{y} = (s, y_{rot})$)

1: $(z, c) = x_{rot} + y_{rot}$    ▷ Regular binary addition, with sum z and last carry c.
2: $z' = z + c$    ▷ Regular binary addition.
3: return $(s, z')$

---

Another choice may be made when considering how to store a rotated value $\tilde{x}=G(s,x_{rot})$. The approach that can probably be implemented the easiest (and the one that is implicitly assumed in the algorithms) is to use different registers for s and $x_{rot}$. In this case the security only arises as a result of the rotation of the bits in $x_{rot}$. Depending on the leakage model, this can mean no measurable increase in security at all, for example when using the Hamming weight. The number of bits that are 0 or 1 does not change, only their position, so $HW(x)=HW(x_{rot})$.

The other option is to store s and $x_{rot}$ both in the same register. Now, using Hamming weight as leakage function, we get additional noise from HW(s), which increases the security under this assumption. Storing everything in the same register, however, forces us to adapt our algorithms to make sure to keep s and $x_{rot}$ separated during calculations. This introduces some complications, including: Rotating an already rotated value would have to leave the rotation-part fixed while correctly cycling through the bits of the value part. Also, anytime we perform an addition $x_{rot}+y_{rot}$ we cannot simply add the registers of $x_{rot}$ and $y_{rot}$ like we would usually do. Instead a custom bitwise addition algorithm would have to be introduced that, depending on whether s is stored to the right or to the left of $x_{rot}$, would only add the value parts. Similar and perhaps even more complicated considerations would have to be made for multiplication.

One more alteration could be made for both the same register and different register storage. As mentioned earlier, sufficient spacing must be left between the MSB and the LSB to prevent an overflow from the carry during calculations. Although a single 0-bit would be enough, in most use cases there will be more than one bit between MSB and LSB because of the restricted value space of the variables compared to the word length. This spacing could be filled with random bits instead of all zeros. However, similarly to the original problem, one would have to make sure that during calculations no unwanted overflow occurs between the bits that represent the actual value and the randomness in the spacing. This procedure could further increase the security due to the additional noise introduced by the random bits.

The new countermeasures described herein may be used in any situation where an adversary needs to extract one or more bits at a specific position of a sensitive value through side channel analysis. An example of this would be the attacks on Dilithium described above. There, the attacked value is the secret nonce y. It is involved in the computation $z=y+cs_1$. All the sensitive computations may be performed with Algorithms 5 and 3 respectively.

The overhead of countermeasures described herein will be compared to Boolean and arithmetic masking, both in terms of efficiency and number of required fresh elements. For this, only the specific case of $z=y+cs_1$ is analyzed, where c is a public polynomial with coefficients in $\{0, \pm1\}$.

The initial rotation (Algorithm 1) as well as the addition of rotated values (Algorithm 3) are performed using a constant 4 and 13 operations respectively, independent of the inputs. For the multiplication (Algorithm 5), $10\omega$ operations are needed. For arithmetic masking it takes $2 n_s-2$ operations to mask a given value (with $n_s$ being the number of shares). Addition takes $n_s$ operations, and multiplication of public and masked values also takes $n_s$ operations. For a low number of shares this is comparable to the new rotation method, but the actual number of operations could be higher when taking into account different refreshing schemes. When using Boolean masking the numbers are much higher for addition, see Table 1. Table 1 illustrates the number of operations required for Masking/Rotation, Addition, and Multiplication for the Rotation approach, using Arithmetic shares, and using Boolean shares. We do not specify the number of operations for Boolean masked multiplication, because this is generally avoided in practice due to its inefficiency.

Regarding fresh random elements, only the initial rotation takes $\log(\omega)$ bits, compared to $\omega(n_s-1)$ bits for masking. Table 2 compares the number of fresh random bits required for Masking/Rotation, Addition, and Multiplication for the Rotation approach, using Arithmetic shares, and using Boolean shares. The presented algorithms for addition and multiplication do not require any more random bits, but may be augmented with Algorithm 2, analogously to a refresh of (Boolean or arithmetic) shares. In that case each further rotation would also only take $\log(\omega)$ random bits, compared to $$\omega\left(\frac{n_s^2 - n_s}{2}\right)$$

for a classic refresh.

TABLE 1

| Function | Rotation | Arithmetic | Boolean |
|---|---|---|---|
| Masking/Rotation | 4 | $2n_s - 2$ | $2n_s - 2$ |
| Addition | 13 | $n_s$ | $n_s^2\left(\frac{17}{2}l + 7\right) + n_s\left(1 - \frac{7}{2}l\right) + 2l$ |
| Multiplication | $100\omega$ | $n_s$ | — |

TABLE 2

| Function | Rotation | Arithmetic | Boolean |
|---|---|---|---|
| Masking/Rotation | $\log_2 \omega$ | $\omega(n_s - 1)$ | $\omega(n_s - 1)$ |
| Addition | 0 | $\omega\left(\frac{n_s^2 - n_s}{2}\right)$ | $n_s{}^2(7l + 7) + n_s(1 - 2l) + 2l$ |
| Multiplication | 0 | $\mathcal{O}(n_s{}^2)$ | — |

The security of the countermeasure will be compared to masking, both Boolean and arithmetic. To do this, the mutual information (MI) is calculated, which is a measure of how much information a side channel measurement holds about a sensitive value. Simulations were developed and evaluated that considered two implementation scenarios: one where the rotation and value part are stored in different registers, and another where they are stored in the same register. The Hamming weight was chosen as the leakage function with additional noise from a normal distribution with standard deviation $\sigma$. As discussed earlier, when the rotation and value part are stored in separate registers and only the (rotated) value part is leaked, the Hamming weight would be the same as for the unprotected value and no increase in security could be detected. For this reason the leakage function was adapted by introducing random weights to the Hamming weight according to:

$$HW_\lambda(x) = \sum_{i=0}^{\omega-1} \lambda_i x_i, \text{ with } \sum_{i=0}^{\omega-1} \lambda_i = \omega.$$

Here $x_i$ denotes the i-th bit of a binary value x and the weights $\lambda_i$ are sampled uniformly and independently from [0,1] and then scaled, such that their sum is equal to a.

FIGS. 1A-D illustrate the results of the simulations. On the x-Axis the noise level $\sigma$ is plotted. The mutual information for the different countermeasures is then plotted on the y-axis. In addition to the new rotation method, Boolean and arithmetic masking (with d=2 shares) and the unprotected case were included for comparison.

Figure 1B:
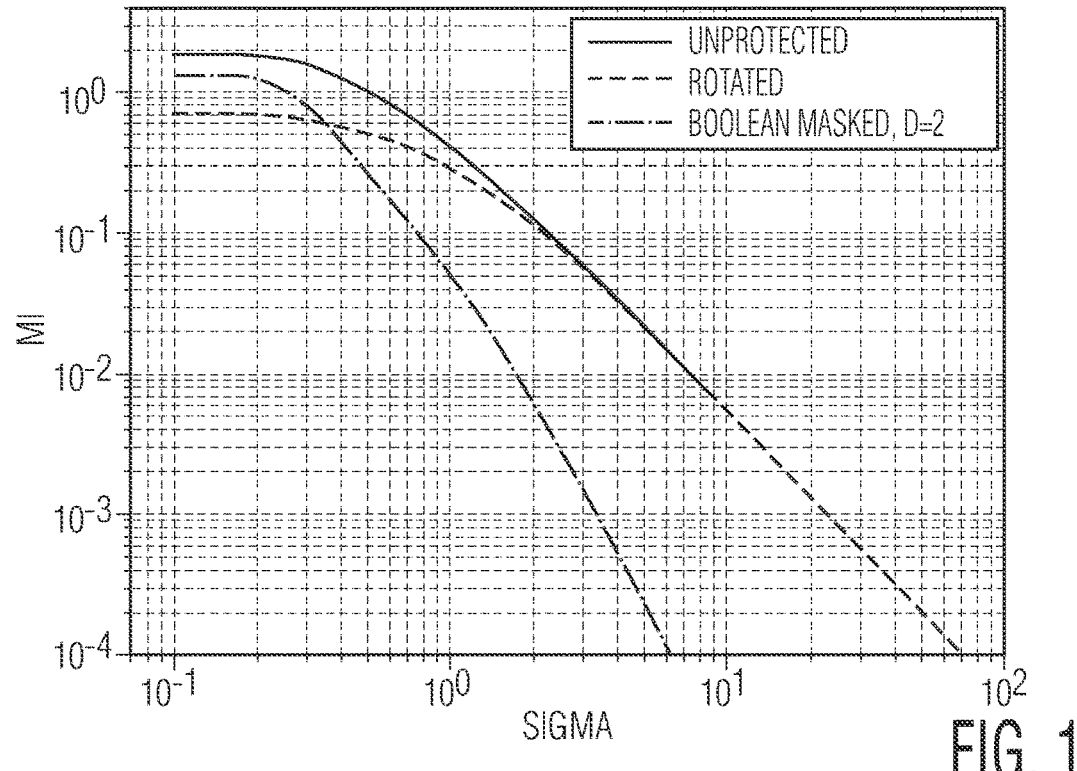
Figure 1C:
Figure 1C:
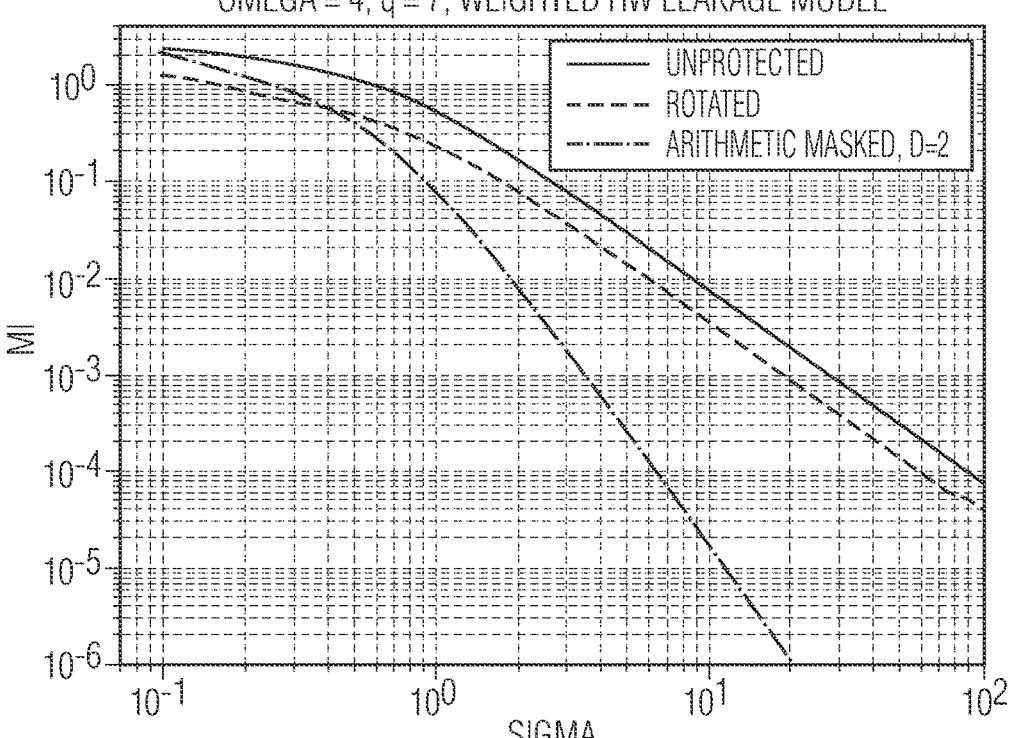
Figure 1D:
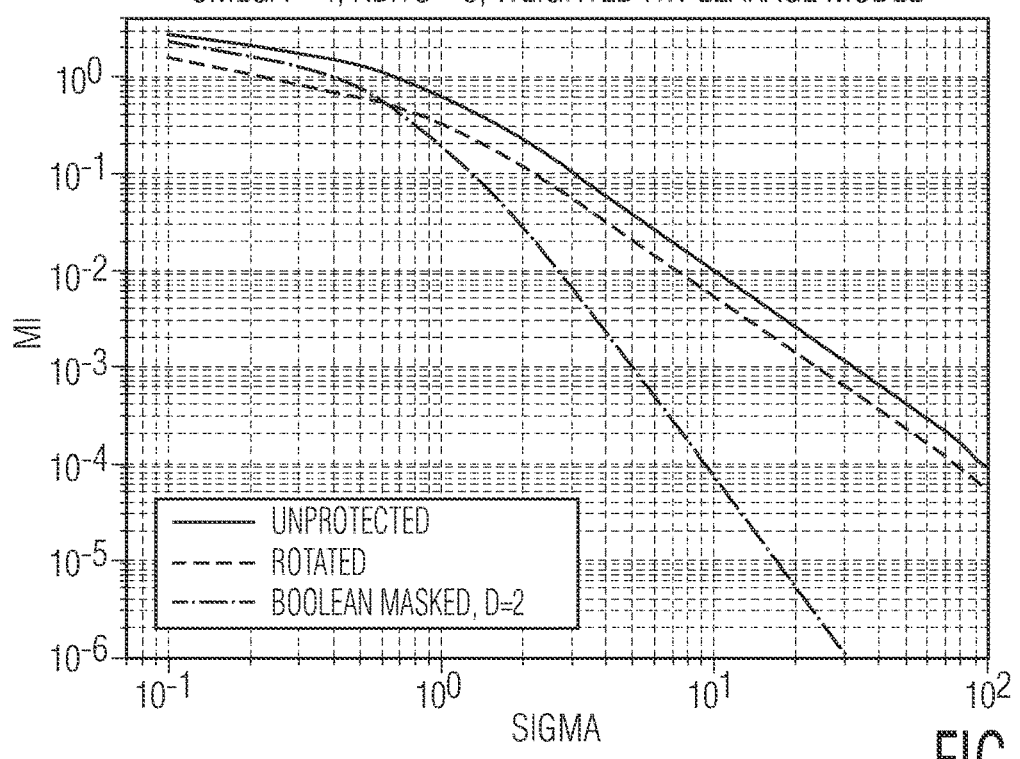

FIGS. 1A and 1B illustrate the scenario where the rotation and value parts are stored in the same registers, and in FIGS. 1C and 1D, the rotation and value parts were stored in different registers. In FIGS. 1A and 1C, arithmetic masking is compared, and in FIGS. 1B and 1D, Boolean masking is compared.

Due to the complexity of the simulation, small toy examples were chosen with a processor word length of $\omega$=4. In the comparison to arithmetic masking q=7 and secrets $x\in[0,q-1]$ are used, and for Boolean masking, secrets of size nbits=3 are used, so $x\in[0,2^{nbits}-1]$. In an actual implementation of Dilithium the parameters would be $\omega\in\{32,64\}$ (depending on the underlying hardware), $nbits\in\{17,19\}$ (depending on the NIST security level) and $q=2^{23}-2^{13}+1$. Still, it is expected that the results straightforwardly translate.

Looking at the plots in FIGS. 1A and 1B, it can be seen that the new method reduces the MI when compared to an unprotected implementation, which makes it harder for an adversary to extract sensitive values from side channel measurements. However, for increasing noise the MI converges to that of the unprotected case. This may be explained as follows: the rotation part adds a few bits of noise to the Hamming weight, but as the overall noise of the measurement increases, the impact of the extra noise gets lower.

The plots in FIGS. 1C and 1D show a different picture, where the rotation countermeasure stays consistently ahead of the unprotected case, even for higher noise levels. As expected, the increase in security for arithmetic and Boolean masking is higher than for rotation in every scenario. However, as mentioned before the new rotation method is more lightweight, and so is suited for situations where a trade-off between efficiency and security can be made.

Figure 2:
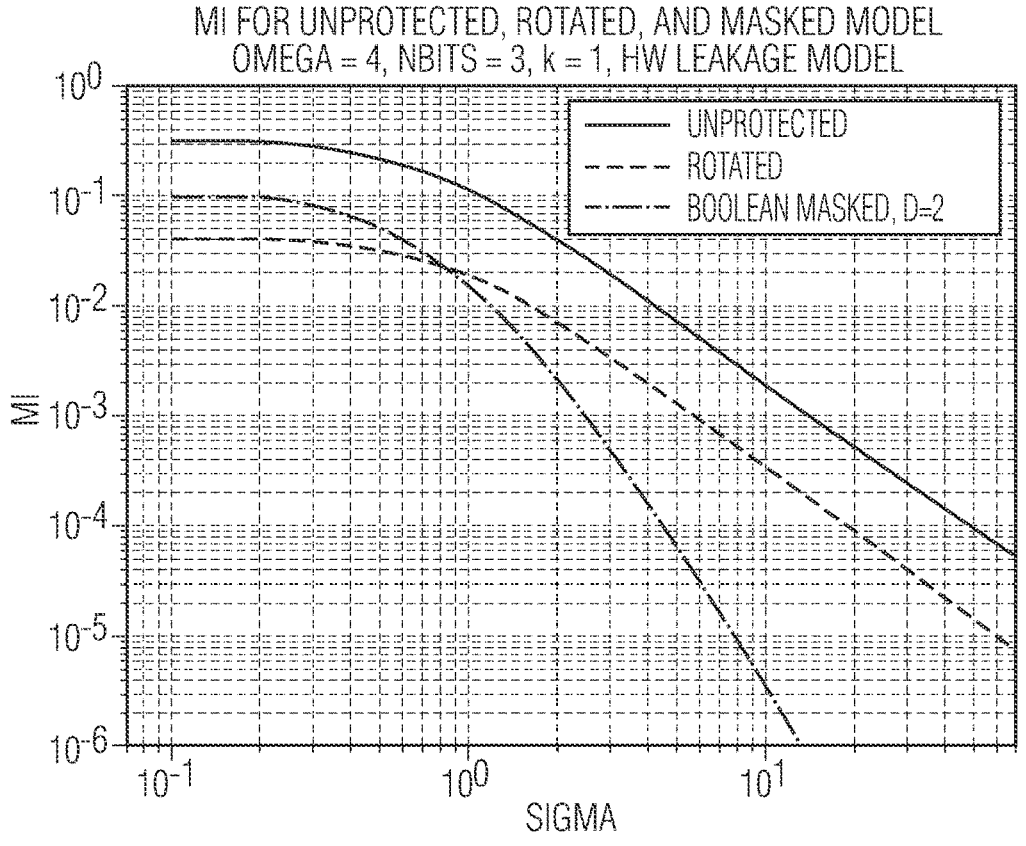
FIG. 2 illustrates a plot of the results of the simulation for recovering a single bit.

In the above simulations, the recovery of the full secret value was looked at. Next, the impact of rotation on the recovery of a single sensitive bit is simulated. FIG. 2 illustrates a plot of the results of the simulation for recovering a single bit. For this, $\omega$=4, nbits=3 is again chosen and the position of the sensitive bit is k=1. The rotation countermeasure is compared to the unprotected case and Boolean masking with d=2 shares. The leakage model is the (unweighted) Hamming weight.

Figure 3:
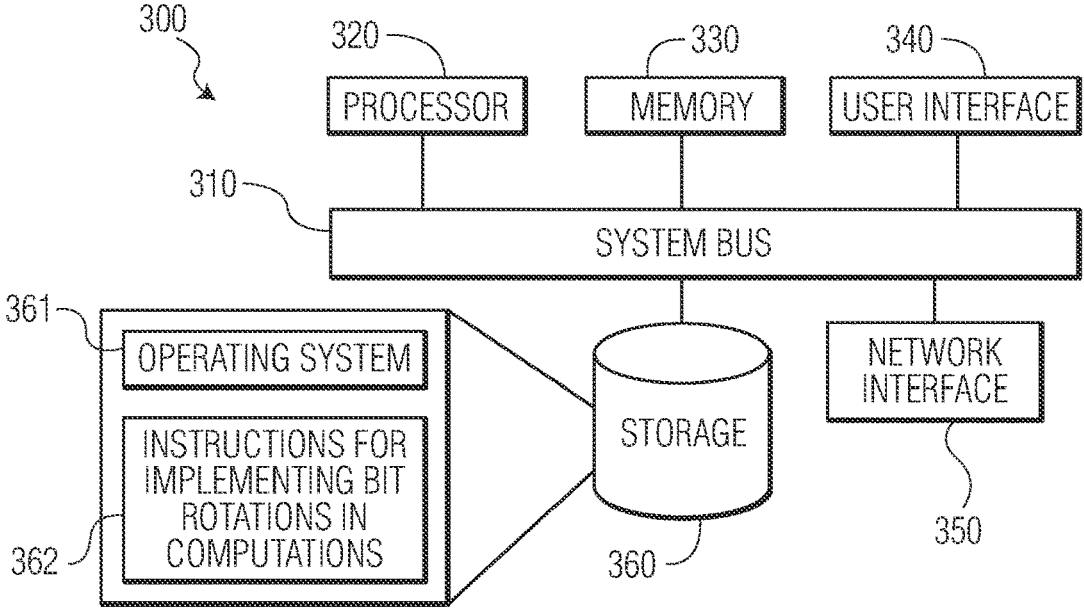
FIG. 3 illustrates an exemplary hardware diagram for implementing bit rotations in computations in cryptography.

FIG. 3 illustrates an exemplary hardware diagram 300 for implementing bit rotations in computations in cryptography. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, microcontroller, graphics processing unit (GPU), neural network processor, field programmable gate array (FPGA), application-specific integrated circuit (ASIC), or other similar devices. The processor may be a secure processor or include a secure processing portion or core that resists tampering.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices. Further, some portion or all of the memory may be secure memory with limited authorized access and that is tamper resistant.

The user interface 340 may include one or more devices for enabling communication with a user such as an administrator. For example, the user interface 340 may include a display, a touch interface, a mouse, and/or a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol or other communications protocols, including wireless protocols. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. The storage 362 may store instructions for implementing bit rotations in computations in cryptography as described above.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

The system bus 310 allows communication between the processor 320, memory 330, user interface 340, storage 360, and network interface 350.

While the host device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A data processing system comprising instructions embodied in a non-transitory computer readable medium, the instructions for carrying out a binary arithmetic operation in a cryptographic operation for lattice-based cryptography in a processor, the instructions, when executed, cause the processor to perform a method comprising:

performing a binary addition of a first binary value $x_1$ and a second binary value $y_1$ with $\omega$ bits, wherein bits of the first binary value $x_1$ are rotated by a first rotation value $s_1$ and bits of the second binary value $y_1$ are rotated by a second rotation value $t_1$, comprising:

rotating the bits of the first binary value $x_1$ by the second rotation value $t_1$ to produce a first rotated binary value $x_{1,rot}$;

rotating the bits of the second binary value $y_1$ by the first rotation value $s_1$ to produce a second rotated binary value $y_{1,rot}$;

calculating a third rotation value $r_1$ by adding the first rotation value $s_1$ and the second rotation value $t_1$ modulo $\omega$; and performing a binary addition of the first rotated binary value $x_{1,rot}$ and the second rotated binary value $y_{1,rot}$ to produce a third rotated binary value $z_1$, wherein the bits of the third rotated binary value $z_1$ are rotated by the third rotation value $r_1$; and performing a binary multiplication of a fourth binary value $x_2$ and a fifth binary value $y_2$ with $\omega$ bits, wherein the bits of the fourth binary value $x_2$ are rotated by a fourth rotation value $s_2$ and the bits of the fifth binary value $y_2$ are rotated by a fifth rotation value $t_2$, comprising:

initializing a sixth rotated value $z_2$ to zero;

for each bit i of the fifth binary value $y_2$ that is equal to 1;

calculating a sixth rotation value $r_2$ by subtracting the fifth rotation value $t_2$ from i where i is an index;

rotating the bits of the fourth binary value $x_2$ by the sixth rotation value $r_2$ to produce a fourth rotated binary value $x_{2,rot}$; and performing a binary addition of the fourth rotated binary value $x_{2,rot}$ and the sixth rotated value $z_2$ to update the sixth rotated value $z_2$, wherein the bits of the sixth rotated value $z_2$ are rotated by the fourth rotation value $s_2$; and wherein the rotating of the bits hides positions of the bits to prevent bit leakage attacks.

2. The data processing system of claim 1, wherein $\omega$ is a power of two and wherein adding the first rotation value $s_1$ and the second rotation value $t_1$ modulo $\omega$ includes calculating $$(s_1 + t_1) \wedge (\omega - 1).$$

3. The data processing system of claim 1, wherein $\omega$ has a value greater than k where k is a number of bits in $x_1$ and $y_1$ and wherein a zero is adjacent the most significant bits of $x_1$ and $y_1$.

4. The data processing system of claim 3, wherein a portion of the bits between the zero adjacent the most significant bits of $x_1$ and $y_1$ and a least significant bits of $x_1$ and $y_1$ are set to random values.

5. The data processing system of claim 1, wherein $\omega$ has a value greater than 2k where k is a number of bits in $x_2$ and $y_2$ and wherein k zeros are adjacent the most significant bits of $x_2$ and $y_2$.

6. The data processing system of claim 5, wherein a portion of the bits between the k zeros adjacent the most significant bits of $x_2$ and $y_2$ and a least significant bits of $x_2$ and $y_2$ are set to random values.

7. The data processing system of claim 1, further comprising randomly generating $s_1$, $t_1$, $s_2$, and $t_2$.

8. A data processing system comprising instructions embodied in a non-transitory computer readable medium, the instructions for carrying out a binary arithmetic operation in a cryptographic operation for lattice-based cryptography in a processor, the instructions, when executed, cause the processor to perform a method comprising:

performing a binary addition of a first binary value $x_1$ and a second binary value $y_1$ with $\omega$ bits, wherein bits of the first binary value $x_1$ are rotated by a first rotation value $s_1$ and bits of the second binary value $y_1$ are rotated by a second rotation value $t_1$, comprising:

calculating a third rotation value $r_1$ by subtracting the second rotation value $t_1$ from the first rotation value $s_1$ modulo $\omega$;

rotating the bits of the second binary value $y_1$ by the third rotation value $r_1$ to produce a second rotated binary value $y_{1,rot}$; and performing a binary addition of the first binary value $x_1$ and the second rotated binary value $y_{1,rot}$ to produce a third rotated binary value $z_1$, wherein the bits of the third rotated binary value $z_1$ are rotated by the first rotation value $s_1$; and performing a binary multiplication of a fourth binary value $x_2$ and a fifth binary value $y_2$ with $\omega$ bits, wherein the bits of the fourth binary value $x_2$ are rotated by a fourth rotation value $s_2$, comprising:

initializing a sixth rotated value $z_2$ to zero;

for each bit i of the fifth binary value $y_2$ that is equal to 1:

rotating the bits of the fourth binary value $x_2$ by i to produce a fourth rotated binary value $x_{2,rot}$, where i is an index; and performing a binary addition of the fourth rotated binary value $x_{2,rot}$ and the sixth rotated value $z_2$ to update the sixth rotated value $z_2$, wherein the bits of the sixth rotated value $z_2$ are rotated by the fourth rotation value $s_2$; and wherein the rotating of the bits hides positions of the bits to prevent bit leakage attacks.

9. The data processing system of claim 8, wherein $\omega$ is a power of two and wherein adding the first rotation value $s_1$ and the second rotation value $t_1$ modulo $\omega$ includes calculating $$(s_1 + t_1) \wedge (\omega - 1).$$

10. The data processing system of claim 8, wherein $\omega$ has a value greater than k where k is a number of bits in $x_1$ and $y_1$ and wherein a zero is adjacent the most significant bit of $x_1$.

11. The data processing system of claim 10, wherein a portion of the bits between the k zeros adjacent the most significant bits of $x_1$ and $y_1$ and a least significant bits of $x_1$ and $y_1$ are set to random values.

12. The data processing system of claim 1, further comprising randomly generating $s_1$, and $s_2$.

13. A method of carrying out a binary arithmetic operation in a cryptographic operation for lattice-based cryptography in a processor, the method comprising:

performing, by the processor, a binary addition of a first binary value $x_1$ and a second binary value $y_1$ with $\omega$ bits, wherein bits of the first binary value $x_1$ are rotated by a first rotation value $s_1$ and bits of the second binary value $y_1$ are rotated by a second rotation value $t_1$, comprising:

rotating, by the processor, the bits of the first binary value $x_1$ by the second rotation value $t_1$ to produce a first rotated binary value $x_{1,rot}$;

rotating, by the processor, the bits of the second binary value $y_1$ by the first rotation value $s_1$ to produce a second rotated binary value $y_{1,rot}$;

calculating, by the processor, a third rotation value $r_1$ by adding the first rotation value $s_1$ and the second rotation value $t_1$ modulo $\omega$; and performing, by the processor, a binary addition of the first rotated binary value $x_{1,rot}$ and the second rotated binary value $y_1$, rot to produce a third rotated binary value $z_1$, wherein the bits of the third rotated binary value $z_1$ are rotated by the third rotation value $r_1$; and performing, by the processor, a binary multiplication of a fourth binary value $x_2$ and a fifth binary value $y_2$ with $\omega$ bits, wherein the bits of the fourth binary value $x_2$ are rotated by a fourth rotation value $s_2$ and the bits of the fifth binary value $y_2$ are rotated by a fifth rotation value $t_2$, comprising:

initializing, by the processor, a sixth rotated value $z_2$ to zero that is equal to 1;

for each bit i of the fifth binary value $y_2$:

calculating, by the processor, a sixth rotation value $r_2$ by subtracting the fifth rotation value $t_2$ from i where i is an index;

rotating, by the processor, the bits of the fourth binary value $x_2$ by the sixth rotation value $r_2$ to produce a fourth rotated binary value $x_{2,rot}$, and performing, by the processor, a binary addition of the fourth rotated binary value $x_{2,rot}$ and the sixth rotated value $z_2$ to update the sixth rotated value $z_2$, wherein the bits of the sixth rotated value $z_2$ are rotated by the fourth rotation value $s_2$; and wherein the rotating of the bits hides positions of the bits to prevent bit leakage attacks.

14. The method of claim 13, wherein $\omega$ is a power of two and wherein adding the first rotation value $s_1$ and the second rotation value $t_1$ modulo $\omega$ includes calculating $(s_1+t_1)\hat{\ }(\omega-1)$.

15. The method of claim 13, wherein $\omega$ has a value greater than k where k is a number of bits in $x_1$ and $y_1$ and wherein a zero is adjacent the most significant bits of $x_1$ and $y_1$.

16. The method of claim 15, wherein a portion of the bits between the zero adjacent the most significant bits of $x_1$ and $y_1$ and a least significant bits of $x_1$ and $y_1$ are set to random values.

17. The method of claim 13, wherein $\omega$ has a value greater than 2k where k is a number of bits in $x_2$ and $y_2$ and wherein k zeros are adjacent the most significant bits of $x_2$ and $y_2$.

18. The method of claim 17, wherein a portion of the bits between the k zeros adjacent the most significant bits of $x_2$ and $y_2$ and a least significant bits of $x_2$ and $y_2$ are set to random values.

19. The method of claim 13, further comprising randomly generating $s_1$, $t_1$, $s_2$, and $t_2$.

\* \* \* \* \*